United States Patent [19]

Palmér

[11] 4,081,741

[45] Mar. 28, 1978

[54] ON-LOAD TAP CHANGER

[75] Inventor: Peter Palmér, Ludvika, Sweden

[73] Assignee: ASEA Aktiebolag, Vesteras, Sweden

[21] Appl. No.: 735,203

[22] Filed: Oct. 26, 1976

[30] Foreign Application Priority Data

| | | |
|---|---|---|
| Oct. 29, 1975 | Sweden | 7512133 |
| Nov. 6, 1975 | Sweden | 7512432 |

[51] Int. Cl.$^2$ ........................ H02P 13/06; H01F 29/04

[52] U.S. Cl. ................................................ 323/43.5 R

[58] Field of Search ...................... 323/43.5 R, 47, 54, 323/91; 336/90, 150; 200/117 C

[56] References Cited

U.S. PATENT DOCUMENTS

| | | | |
|---|---|---|---|
| 3,581,188 | 5/1971 | Watanabe et al. | 323/43.5 R |
| 3,628,128 | 12/1971 | Buhler | 323/43.5 R |
| 3,934,174 | 1/1976 | Bleibtreu et al. | 323/43.5 R |

FOREIGN PATENT DOCUMENTS

| | | | |
|---|---|---|---|
| 72,826 | 5/1970 | Germany | 323/43.5 R |
| 46-8735 | 5/1971 | Japan | 323/43.5 R |
| 47-580 | 8/1972 | Japan | 323/43.5 R |

*Primary Examiner*—Gerald Goldberg
*Attorney, Agent, or Firm*—Watson, Cole, Grindle & Watson

[57] ABSTRACT

On-load tap changer apparatus of the type having two connection branches, each of which is connected between a common connection point and a separate movable contact, at least one branch having a resistor in series with the first contact device, and the other branch including a vacuum element with a second contact device connected in parallel with the vacuum element in the second connection branch. Alternatively, the contacts of a change-over switch are connected to the two connection branches and a vacuum element is connected between the contacts of the change-over switch.

3 Claims, 6 Drawing Figures

ON-LOAD TAP CHANGER

BACKGROUND OF THE INVENTION

The present invention relates to apparatus of both the selector switch type and the pre-selector type wherein a tap changer comprises two connection branches each connected between a common point of connection and its separate movable contact, with at least one branch containing a resistor in series with a contact device. The other branch may or may not include a vacuum element. The two movable contacts are successively displaceable between a number of fixed contacts intended for connection to the tappings of a regulating transformer.

It has been proposed previously to use vacuum elements in tap changers for the purpose of, among other things, achieving a relatively high breaking capacity and avoiding the release of gas and contamination of the oil surrounding the contact devices. However, the vacuum elements now available do not withstand any mentionable overcurrents. In a previously proposed tap changer of the abovementioned type, a bridging contact device was inserted in the resistor branch (British Patent Specification No. 1,197,379), thus making possible a division of the current between the two connection branches. A condition for this, however, is that the movable contacts of the connection branches are in good electrical connection with the fixed contacts connected to the tappings of the transformer winding. For example, wear, oxidation or contamination of the contact surfaces may change the contact conditions with time, so that the current will flow substantially only through one of the connection branches. Therefore, in order not to jeopardize the security of operation, both the vacuum element and the bridging contact device must be dimensioned for the full rated and short-circuit current of the transformer, and the stated advantage of the known connection are not fully obtained.

Other previously proposed embodiments with a vacuum element (for example, according to British Patent Specification 1,164,782) also involve certain drawbacks, either because of the great number of required components (for example, two resistors and six contact devices per phase) thereby necessitating a complex operating device, or because the whole transformer current continuously passes through the vacuum element. In the latter instance, elements with great current conducting capacity are required so that the construction thereof is unrealistic from a technical-economic viewpoint.

SUMMARY OF THE INVENTION

One object of the invention is to provide a tap changer in which a single vacuum element and only a few auxiliary contact devices per phase are required and in which the current conducting capacity of the vacuum element is relatively small.

Another object of the invention is to provide a tap changer which, like the above-mentioned known embodiment, has only one vacuum element per phase but which does not involve the drawbacks mentioned.

BRIEF DESCRIPTION OF THE DRAWINGS

The above objects, features and advantages will be apparent from the following description taken in conjunction with the accompanying drawings wherein.

DETAILED DESCRIPTION

Figure 1:
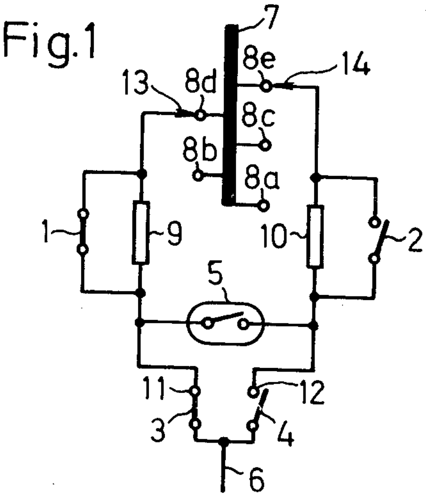
FIG. 1 shows the connection for a tap-changer of a so-called pre-selector type.

The tap-changer shown in FIG. 1 is connected between an output line 6 (or the zero point of a Y-connected three-phase transformer) and a transformer winding 7 which has a plurality of regulating tappings connected to fixed contacts **8*a*–8*e* on the tap-changer. The Figure shows the tap-changer in an operating position, in which the line 6 is connected by way of the tap-changer to the fixed tap contact 8*d***.

Figure 3:
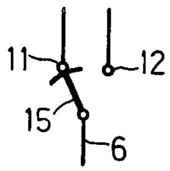
FIG. 3 shows an alternative embodiment of the change-over switch of the tap-changer for line connection.

The tap-changer has two connection branches, each containing a bridging resistor 9 and 10, respectively, parallelly-connected to a by-pass contact device 1 and 2, respectively. The connection branches are connected, in one instance, between one contact each 11 and 12 of a changeover switch for the line 6, which contacts are electrically insulated from each other, and in the other instance between one each of two movable selector contacts 13 and 14 which are successively movable between the fixed tap contacts **8*a*–8*e*. In the change-over switch the two connection branches can be individually connected to the line 6. The change-over switch can either consist of two separate contact devices 3 and 4, as shown in FIG. 1, or of a two-way switch with a sliding contact 15, as shown in FIG. 3. A vacuum element 5 is connected between the contacts 11 and 12** of the changer-over switch.

Figure 2:
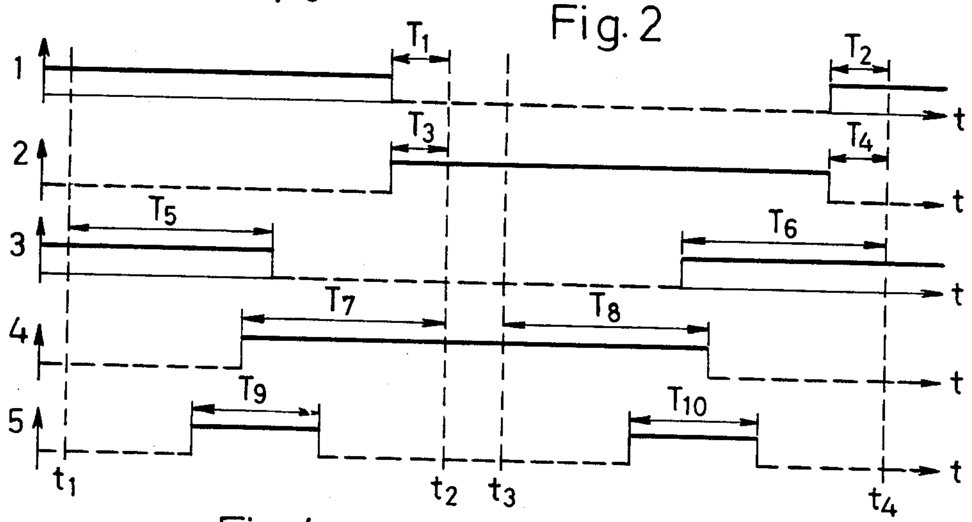
FIG. 2 illustrates the tap-changing operation for the tap-changer of FIG. 1, for switching between two transformer tappings.

The tap-changing operation, in the case of switching between the tappings of the transformer winding, is illustrated in FIG. 2, the on-position of the respective contact device being indicated with an unbroken line and the off-position with a broken line. Switching from tapping **8*d* to tapping 8*e* is accomplished as follows: The operating device of the tap-changer is started at time $t_1$ and successively operates the various contact devices. First the vacuum element 5 is closed and thereafter also the contact device 4 is closed, the contact device 3 then being opened. At the next moment the vacuum element 5 is opened and breaks the circulation current between the tap contacts 8*d* and 8*e* and commutates the line current to the connection branch into which the resistor 10 is connected. The contact device 1 is thereafter opened and the contact device 2 is closed. The switching is now completed and the operating device is disconnected at time $t_2$. Switching in the reverse direction, that is, from tapping 8*e* to tapping 8*d*, takes place in a similar way between times $t_3$ and $t_4$ as is clear from FIG. 2**. Since a resistor is always connected into the branch that is not current-carrying, the transformer is protected if a so-called spontaneous flash-over should occur in the vacuum element.

The tap changer according to FIG. 1 is of the so-called pre-selector type, which means that it is mechanically constructed of two separate apparatus units, namely, a tap selector (consisting of the fixed tap contacts **8*a*–8*e* and the movable contacts 13, 14**) and a diverter switch. As is clear from FIG. 2, the tap-changing procedure in a tap-changer according to the invention can be given a certain form of symmetry during consecutive operations ($T_1 = T_2$, $T_3 = T_4$, $T_5 = T_6$, $T_7 = T_8$, $T_9 = T_{10}$). This enables a simplification of the mechanical construction of the diverter switch. For example, the operation of the various contact devices can be achieved with a relatively simple so-called polygon system.

Figure 4:
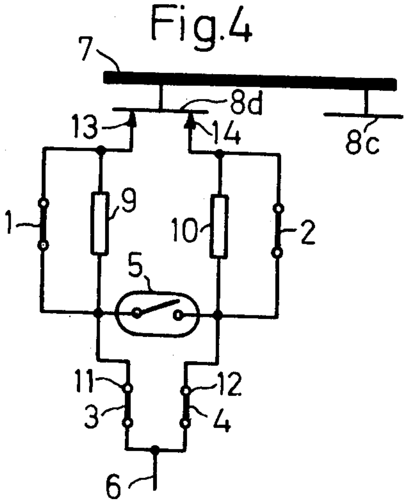
FIG. 4 shows the connection for a tap-changer of the selector switch type.

The tap changer shown in FIG. 4 is in principle constructed in the same way as the tap-changer according to FIG. 1 as far as the connection is concerned, but it is mechanically constructed as a so-called selector switch, which means that the tap selector and diverter switch functions are combined in the same apparatus. In the operating position both connection branches are connected to the same tapping on the transformer winding, the current being divided between the two branches. Switching from tapping 8*d* to tapping 8*e* is made as follows. The contact devices 2 and 4 are opened, contact 14 is moved over to the tap contact 8*e*, whereafter the vacuum element 5 is closed, the contact device 4 is closed, whereafter the contact device 3 is opened. At the next moment the vacuum element 5 is opened and breaks the circulation current between the tap contacts 8*d* and 8*e* and commutates the line current to the connection branch into which the resistor 10 is connected, the contact device 1 then being opened and the contact device 2 being closed. Contact 13 is thereafter moved to tap contact 8*e*, the contact devices 1 and 3 thereafter again being closed.

The two contact devices 3 and 4 can be replaced by a two-way switch with a sliding contact, which in its operating position connects the output line 6 with the two contacts 11 and 12.

Figure 5:
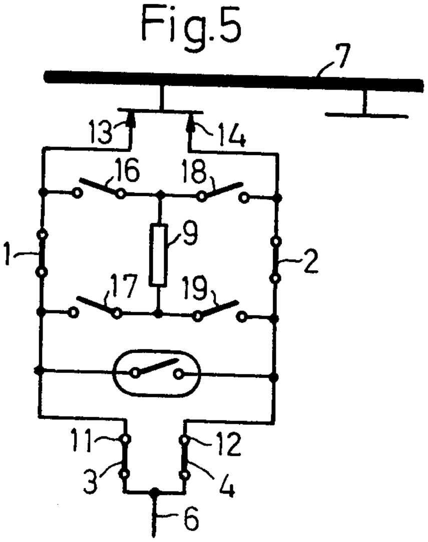
FIG. 5 shows an alternative embodiment of the tap-changer of FIG. 4.

Instead of the two bridging resistors shown, one single bridging resistor 9 plus four contact devices 16, 17, 18 and 19 can be used, as shown in FIG. 5. However, this embodiment requires a relatively complicated operating device.

Figure 6:
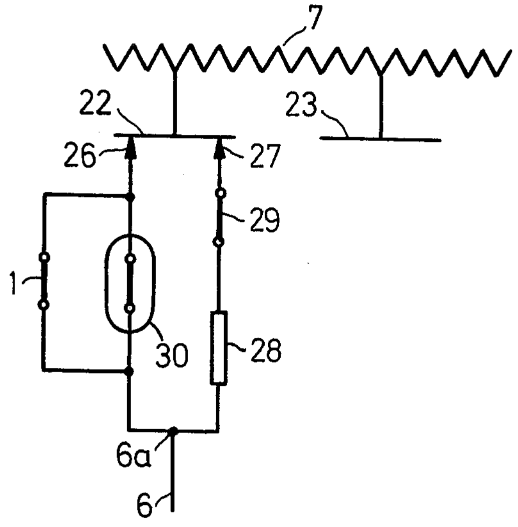
FIG. 6 shows an alternative embodiment at a selector switch type.

The tap-changer shown in FIG. 6 is of the so-called pennant coupling type and is connected to a transformer winding 7 which has a plurality of regulating tappings, of which only two are shown, which are connected to fixed contacts 22, 23 on the tap-changer. FIG. 6 shows the tap-changer in operating position, in which an outgoing line 6 (or the zero point of Y-connected three-phase transformer) is connected by way of the tap-changer to the winding tapping connected to the contact 22. The tap-changer consists of two connection branches each connected between a common connection point 6*a* and a movable contact 26 and 27. One branch contains a current-limiting resistor 28 in series with a first contact device 29. The other branch contains a vacuum element 30 connected in parallel with a second contact device 1.

In the operating position the vacuum element 30 and the contact device 29 and 1 are closed, and the movable contacts 26 and 27 are connected to the same tapping on the winding 7. The current is thereby divided between the vacuum element 30 and the contact device 1, so these connection members do not need to be dimensioned for the full rated and short-circuit current of the transformer winding. When switching from one tapping to another, the resistor contact 27 switches before contact 26 both in the case of voltage increasing and voltage decreasing operation. The switching procedure in case of switching from tap contact 22 to tap contact 23 will thus be as follows.

The contact device 29 and 1 are opened, contact 27 is moved over to tap contact 23, whereafter contact device 29 is again closed. At the next moment the vacuum element 30 is opened and breaks the circulation current between tap contacts 22 and 23 and commutates the line current to the connection branch into which the resistor 28 is connected. Contact 26 is thereafter moved over to the tap contact 23, the vacuum element 30 is closed, whereupon also contact device 1 is closed.

A tap changer according to the invention can suitably be made in the form of a so-called selector switch, i.e. a tap selector arranged to also manage the breaking function. However, it can also be of a so-called pre-selector type, in which the tap selector (consisting of the fixed tap contacts 22, 23, etc., and the movable contacts 26, 27) is combined with a separate diverter switch, as described above with the embodiment of FIGS. 1 and 2.

What is claimed is:

1. On-load tap-changer apparatus comprising two connection branches, each of said branches connected between a common connection point and a separate movable contact, one branch comprising a resistor in series with a first contact device and the other branch containing a vacuum element, each of said movable contacts being movable in succession between a number of fixed contacts intended for connection to the tappings of a regulating transformer, said second connection branch including a second contact device, said second contact device being connected directly in parallel with said vacuum element.

2. On-load multi-phase tap changer apparatus comprising only a single vacuum element per phase and provided with two connection branches connected respectively between each of two contacts of a change-over switch, said contacts being connectible to an external line connection and between each one of two movable selector contacts which are movable in succession between a number of fixed tap contacts adapted to be connected to the tappings of a regulating transformer, each connection branch containing one contact device being adapted to be connected in parallel with a bridging resistor, and said vacuum element being connected between said contacts of said change-over switch.

3. Tap changer apparatus as in claim 2, wherein said vacuum element being closed only upon the switching-over from one tap contact to another.

* * * * *